United States Patent
Tomsich et al.

(10) Patent No.: US 6,668,706 B2
(45) Date of Patent: *Dec. 30, 2003

(54) TOASTER

(75) Inventors: Robert J. Tomsich, Hunting Valley, OH (US); Mark E. Baskin, Hudson, OH (US); William T. Mars, Kent, OH (US); Craig M. Saunders, Rocky River, OH (US)

(73) Assignee: Nesco, Inc., Mayfield Hts, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/291,985

(22) Filed: Nov. 13, 2002

(65) Prior Publication Data

US 2003/0066434 A1 Apr. 10, 2003

Related U.S. Application Data

(60) Continuation of application No. 09/837,935, filed on Apr. 19, 2001, now Pat. No. 6,511,692, which is a division of application No. 09/412,951, filed on Oct. 5, 1999, now Pat. No. 6,357,343

(60) Provisional application No. 60/103,064, filed on Oct. 5, 1998.

(51) Int. Cl.⁷ .......................... A23L 1/00; A23L 27/62; A47J 37/08

(52) U.S. Cl. ...................... 99/329 RT; 99/341; 99/388; 99/389; 99/391; 99/393

(58) Field of Search ........................... 99/326–333, 341, 99/385, 386, 389–391, 392, 393; 219/521, 492, 494, 386

(56) References Cited

U.S. PATENT DOCUMENTS

| | | |
|---|---|---|
| 2,515,866 A | 7/1950 | Fitzgerald |
| 2,566,904 A | 9/1951 | Palmer |
| 2,621,584 A | 12/1952 | Palmer |
| 2,667,828 A | 2/1954 | Koci |
| 2,687,078 A | 8/1954 | Ihrke |
| 2,724,322 A | 11/1955 | Parr |
| 2,878,748 A | 3/1959 | Stanek |
| 2,887,039 A | 5/1959 | Bacon |
| 3,641,921 A | 2/1972 | Toyooka et al. |
| 4,044,660 A | 8/1977 | Montague et al. |
| 4,345,513 A | 8/1982 | Holt |
| 4,742,246 A | 5/1988 | Mori |
| 4,791,862 A | 12/1988 | Hoffmann |
| 5,170,039 A | 12/1992 | Eisenberg |
| 5,296,683 A | 3/1994 | Burkett et al. |
| 5,400,697 A | 3/1995 | Dax et al. |
| 5,771,780 A | 6/1998 | Basora et al. |
| 5,821,503 A | 10/1998 | Witt |
| 6,080,963 A | 6/2000 | Cardillo et al. |
| 6,267,044 B1 | 7/2001 | Friel, Sr. |
| 6,357,343 B1 * | 3/2002 | Tomsich et al. .......... 99/341 X |

FOREIGN PATENT DOCUMENTS

| | | |
|---|---|---|
| DE | 1 096 573 | 1/1961 |
| DE | P 16 54 919 | 3/1971 |
| GB | 933 216 | 8/1963 |
| GB | 1 324 640 | 7/1973 |

* cited by examiner

Primary Examiner—Timothy F. Simone
(74) Attorney, Agent, or Firm—Pearne & Gordon LLP

(57) ABSTRACT

A bread toaster comprising a housing and at least one slot opening for receiving an article to be toasted. The bread is progressively traversed by a linear heat source in a pair of passes. A first pass is at a rate which is sufficient to drive moisture from at least the surface of the bread, but which is insufficient to significantly darken the bread. A second pass is at a rate which is sufficient to darken and toast the surface to a desired degree.

5 Claims, 7 Drawing Sheets

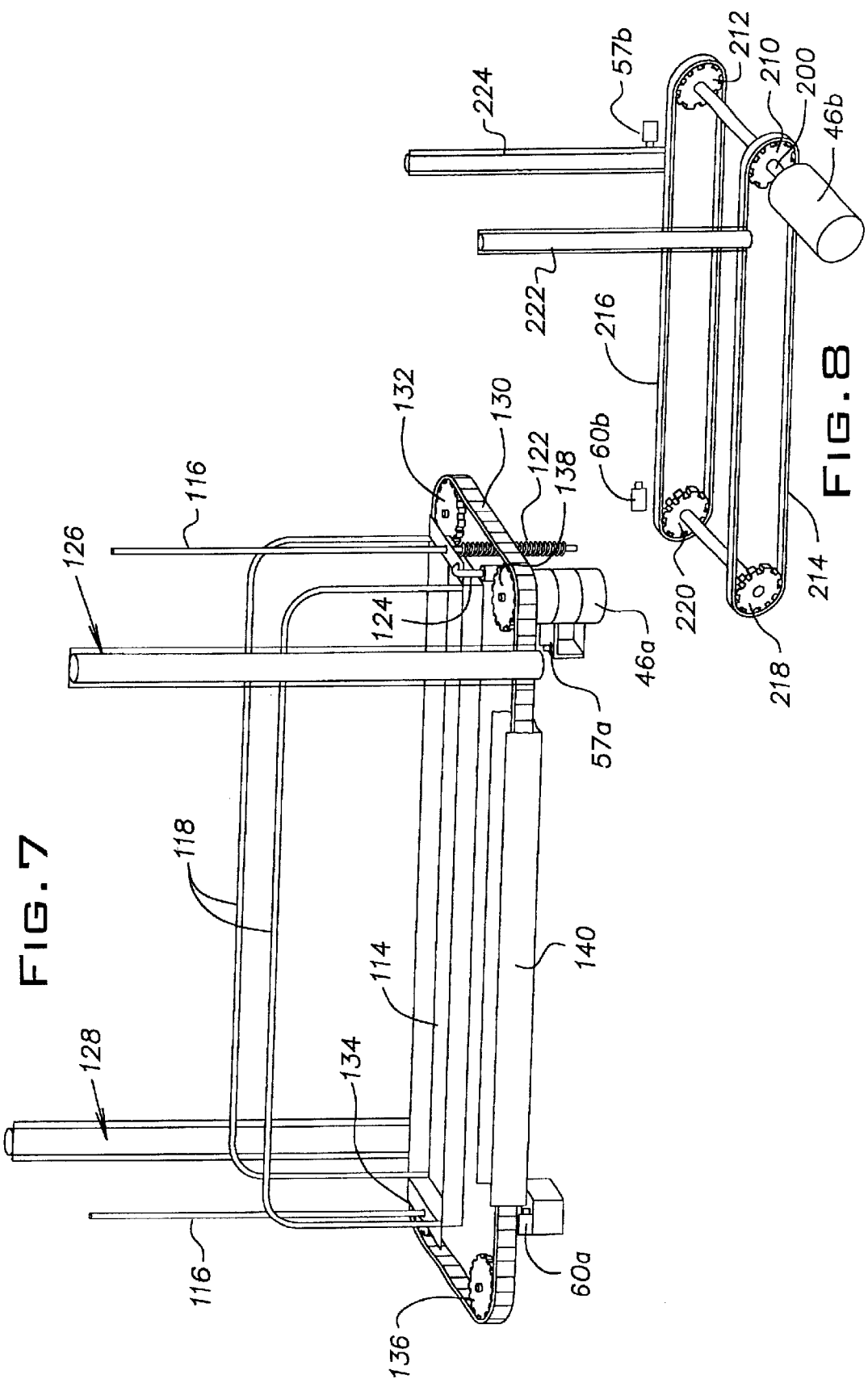

TOASTER

This application is a continuation of U.S. patent application Ser. No. 09/837,935 filed Apr. 19, 2001, now U.S. Pat. No. 6,511,692, which is a divisional of U.S. patent application Ser. No. 09/412,951 filed Oct. 5, 1999, now U.S. Pat. No. 6,357,343, which claims priority of Provisional Application No. 60/103,064 filed Oct. 5, 1998.

BACKGROUND OF THE INVENTION

This invention relates to toasters and, more particularly, to a high speed toaster which will toast bread slices at a rate which is twice as fast as commercially available toasters.

Conventional toasters typically employ spaced heating elements which comprise resister wires mounted on or wrapped about planar insulating sheets. Other arrangements include coiled resisters mounted by insulators to form a planar zig zag pattern on the sides of the bread to be toasted. The pattern formed by the resistance wires generally comprises the entire surface area of the bread faces. Reflectors are mounted to direct the radiant heat toward the bread surface.

Bread is placed in a movable carriage and is manually lowered between the planar heating elements against the bias of a spring. A locking mechanism holds the carriage in this position for a pre-selectable period of time until the bread has reached a desired degree of browness. A bimetallic sensor that deflects from heat activates a circuit to release the latching trigger and permit the carriage to move to an upper non toasting position. When the carriage is moved to the latter position the heating elements are de-energized.

These prior art toasters tend to dissipate much of the radiant heat energy rather than concentrate such energy on the bread to be toasted. Furthermore, after each cycle the bimetallic latching element must cool to a degree which is sufficient to lock the carriage in its downward toasting position. These factors contribute to a relatively slow toasting cycle or series of toasting cycles.

BRIEF SUMMARY OF THE INVENTION

When used in the following description and claims, the term bread is intended to cover bread slices and a wide variety of like comestibles, including waffles and bagels.

This invention provides a toaster having a linear heat source which scans the surface of the bread in a first pass and at a rate which is sufficient to drive moisture from at least the surface of the bread, but which is insufficient to significantly darken the surface. The surface of the bread is then progressively traversed with the linear heat source in a second pass at a rate which is sufficient to darken and toast the surface to a desired degree.

According to one aspect of this invention, the linear heat source comprises a ceramic rod wound with a nichrome resistance wire. The linear heat source is provided with a semi cylindrical reflector which closely conforms to the heat source to focus the radiant energy on a narrow surface area of the bread to be toasted. A pair of such linear heat sources are mounted parallel to each other and horizontally adjacent the upper ends of a bread carriage guide. The bread carriage is mounted between the guides and is adapted to lower and raise bread slices mounted thereon between the parallel heat sources. The carriage is reciprocally driven by a chain and sprocket arrangement which is reversibly driven by a dc motor.

More specifically, this invention comprises a toaster housing having at least one slot opening to receive the bread to be toasted. A holding carriage is movable relative to the slot opening between a first position adjacent the opening to a second position spaced from the opening. A drive motor drives the carriage through a chain drive transmission and moves the carriage from the first position to the second position and from the second position back to the first position. A first switch is responsive to movement of the carriage to the second position to reverse the travel of the carriage from the second position to the first position. A second switch is responsive to movement of the carriage to the first position to de-energize the motor and terminate carriage travel. A substantially linear heat source is adjacent the first position and extends transversely across the path of travel of the carriage so that the bread passes the linear heat source as the carriage travels from the first position to the second position, and again passes the linear heat source as the carriage moves from the second position back to the first position.

According to another aspect of this invention the toaster includes a conventional carriage which is manually operated to a down or toasting position against the bias of a return spring. The carriage is latched in this position by a solenoid operated latching member. Linear heat sources are mounted in a vertical position on a chain driven carriage which is driven by a reversing dc motor. With the carriage in a down and latched position, the linear heat sources traverse opposite faces of the bread in opposite directions in a first pass to drive moisture from at least the surfaces of the bread and then traverse the surfaces in an opposite direction in a second pass at a rate which is sufficient to darken and toast the surface to a desired degree.

In each embodiment, opposite sides of the toaster are provided with transparent glass panels so that the toasting operation may be observed.

BRIEF DESCRIPTION OF THE DRAWINGS

FIG. 2a is a cross sectional view, the plane of the section being indicated by the line 2-a–2a in FIG. 2;

FIG. 7 is a fragmentary view of certain interior structure of the toaster illustrated in FIG. 6;

FIG. 8 is a schematic view of certain interior operating structure according to another aspect of this invention;

DETAILED DESCRIPTION OF THE INVENTION

Figure 1:
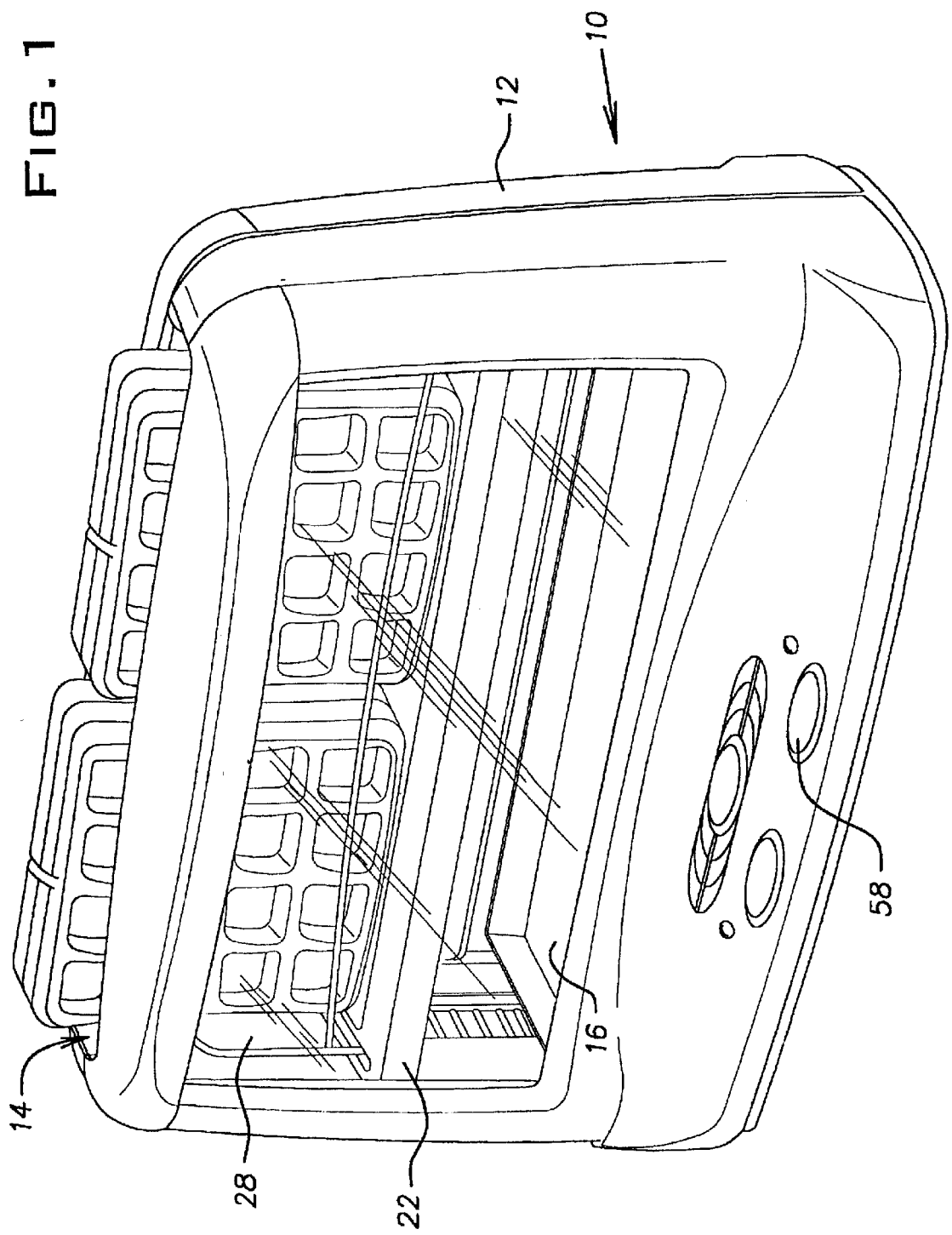
FIG. 1 is a perspective view of a toaster according to one aspect of this invention.
Figure 2:
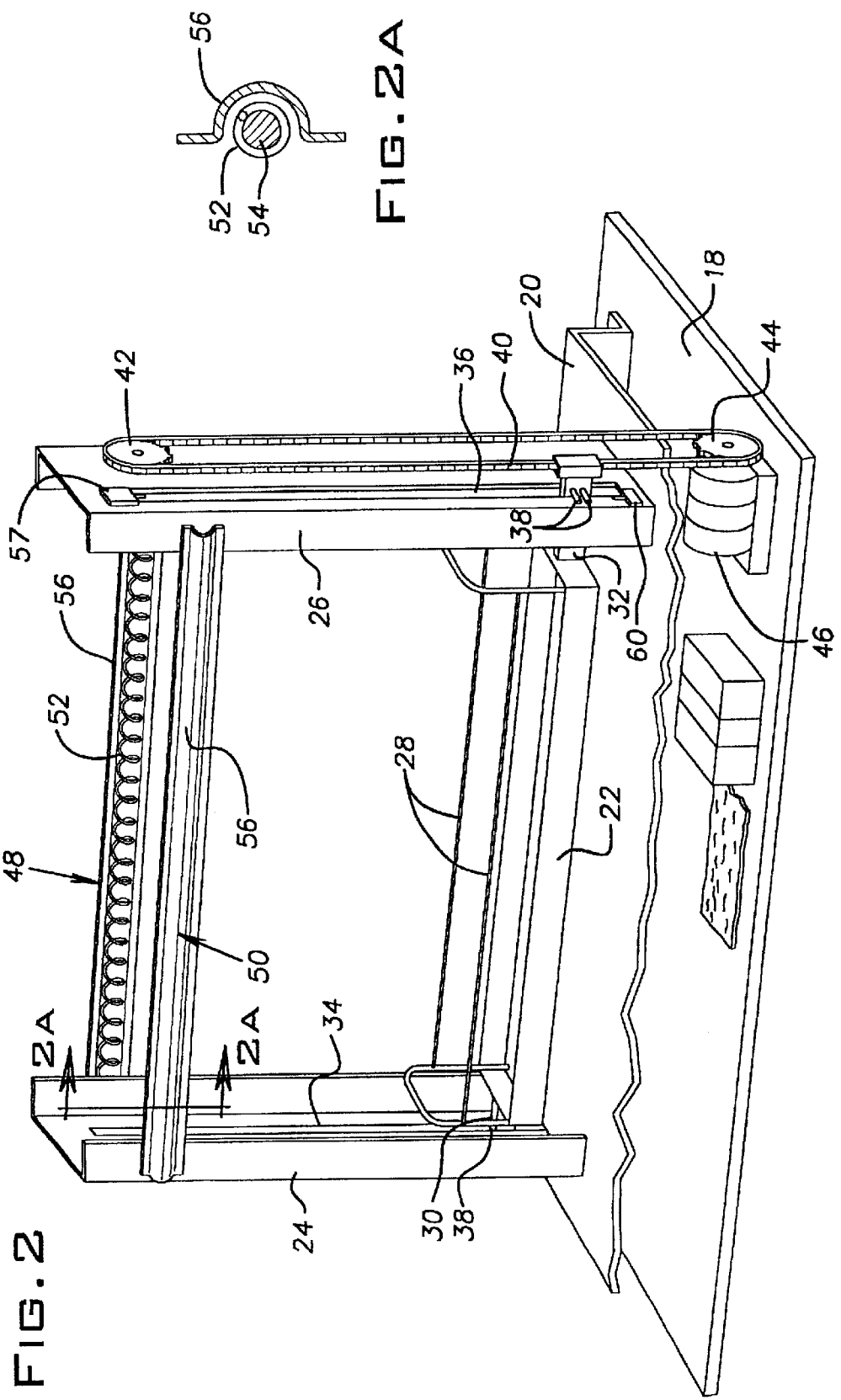
FIG. 2 is a perspective fragmentary view of the toaster illustrated in FIG. 1 with the outer casing removed to show details of construction.

Referring now to FIGS. 1 and 2 there is illustrated a toaster 10 according to one aspect of this invention. The toaster 10 includes a housing or casing 12 having a top slot opening 14 adapted to receive bread, bagels, waffles, or the like. The sides of the housing 12 are provided with transparent panels 16 so that one may view the toasting procedure.

Referring particularly to FIG. 2 the toaster includes a base 18, a support table 20, a carriage 22, and guide supports 24 and 26 for the carriage 22. The carriage 22 is provided with a wire cage assembly 28 which supports the articles to be toasted on the carriage 22. The carriage 22 is provided with axially aligned end projections 30 and 32 which respectively extend through slots 34 and 36 in the supports 24 and 26. The projections 30 and 32 are guided in the slots by roller elements 38 which bear against the supports 24 and 26. The projection 32 is attached at its end to a drive chain 40 which is trained about an upper idler sprocket 42 and a lower drive sprocket 44. The sprocket 44 is driven by a reversible dc motor 46.

A pair of linear heat sources 48 and 50 extend transversely to the path of travel of the carriage 22 and are mounted adjacent the upper ends of the supports 24 and 26. Each linear heat source 48 and 50 includes a resistance heating coil 52 wound about a ceramic rod 54. In a specific embodiment of the invention, the ceramic rod is wound with 35 turns of N180-012 nichrome wire per six inches of rod. A semi-cylindrical, highly reflective reflector 56 partially surrounds each rod and wire assembly.

With the carriage 22 in an up position and with an upper guide roller 38 engaging a normally closed upper limit switch 57, bread slices are loaded onto the carriage 22. A start cycle push button 58 is depressed to start a cycle. Initiation of the cycle provides power to the linear heating elements 48 and 50 to preheat the elements to an operating temperature. When the operating temperature is reached, the carriage 22 is lowered and the bread is progressively traversed by the linear heat sources 48 and 50. The carriage is lowered at a rate which is sufficient to drive moisture from at least the surface of the bread, but which is insufficient to significantly darken the surface. When the carriage reaches the lower portion of the travel the lower guard roller 38 closes a normally open limit switch 60 to reverse the drive direction of the motor 46 so that the bread is progressively traversed in a second pass by the linear heat sources 48 and 50. The rate of traversal is sufficient to darken and toast the surface to a desired degree.

Figure 3:
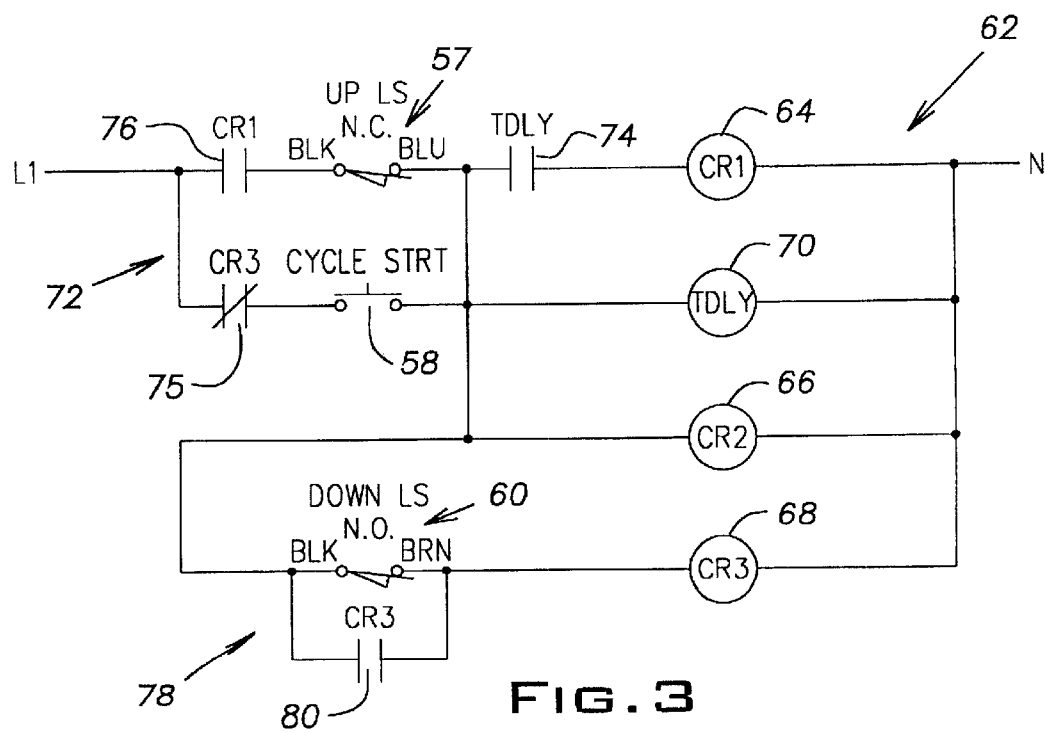
FIGS. 3, 4, and 5 illustrate the circuitry for the toaster.
Figure 4:
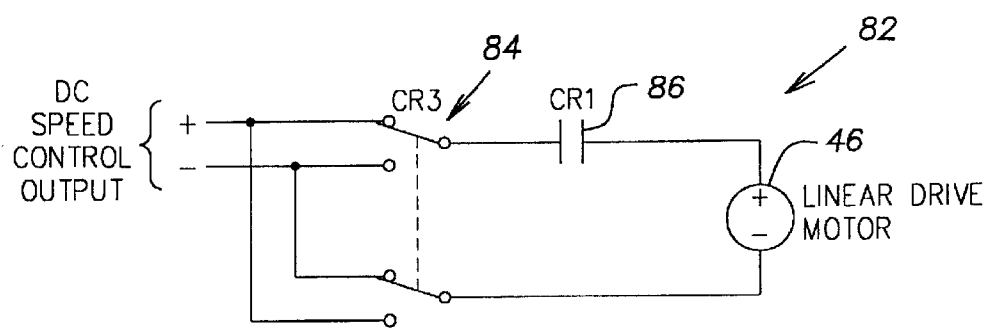
Figure 5:
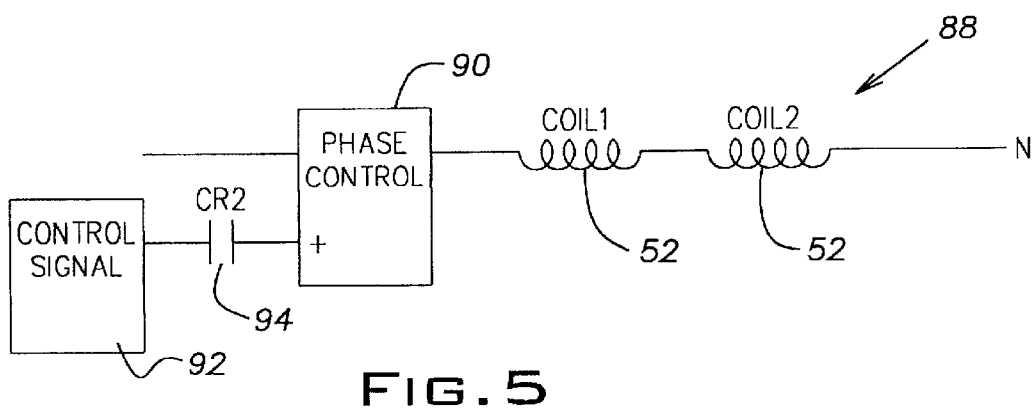

Referring now to FIGS. 3, 4, and 5, a control circuit 62 includes relays CR1, CR2, CR3, and TDLY, respectively having coils 64, 66, 68, and 70 connected in parallel to a first latching circuit 72. The coil 64 of the relay CR1 is connected to the first latching circuit 72 through a normally open contact 74 of the relay TDLY. The first latching circuit 72 includes the cycle start push button 58 and the normally closed upper limit switch 57 connected in parallel to the positive terminal L1 of a power source. The cycle start push button 58 is connected to the positive terminal L1 through a normally closed contact 75 of the relay CR3, while the upper limit switch 57 is connected to the positive terminal L1 through a normally open contact 76 of the relay CR1.

The coil 68 of the relay CR3 is connected to the first latching circuit 72 through a second latching circuit 78, which includes a normally open contact 80 of the relay CR3 connected in parallel to the normally open lower limit switch 60.

A motor circuit 82 includes a contact arrangement of relay CR3 that forms a double-pole, double-throw switch 84 connecting the motor 46 to positive and negative terminals of a dc speed control output. A normally open contact 86 of CR1 is disposed in the motor circuit 82 between the switch 84 and the motor 46. In a first position, the switch 84 connects the dc speed control output to the motor 46 with a polarity that causes the motor 46 to rotate in a first direction which drives the carriage 22 downwardly, whereas in a second position, the switch 84 connects the dc speed control output to the motor 46 with a reverse polarity that causes the motor 46 to rotate in a reversed direction that moves the carriage upwardly.

A heater circuit 88 includes the heating coils 52 that are provided with power through a phase controller 90. The phase controller 90 is connected to a control signal 92 through a normally open contact 94 of the relay CR2.

When the cycle start push button 58 is depressed to start a cycle, the first latching circuit 72 closes through the cycle start push button 58. As a result, the coil 66 of the relay CR2 is energized, which closes the contact 94 of the relay CR2 in the heater circuit 88, thereby transmitting the control signal to the phase control 90 and providing power to the heating coils 52. In addition, the coil 70 of the relay TDLY is energized, which closes the contact 74 of the relay TDLY, thereby providing power to the coil 64 of the relay CR1. The energization of the coil 64 of the relay CR1 closes the contact 86 and the motor circuit 82, thereby providing power to the motor 46 and causing the carriage 22 to move downwardly. In this manner, there is a time delay between the provision of power to the heating coils 52 to heat up before the carriage is moved downwardly past the heating coils 52.

The energization of the coil 64 of the relay CR1 also closes the contact 76 in the first latching circuit 72, thereby closing the first latching circuit 72 through the upper limit switch 57 and permitting the cycle start push utton 58 to be released, without cutting off power to the coils 64, 66, 68, and 70 of the relays CR1, CR2, CR3, and TDLY. When the carriage reaches the bottom of its downward travel, the lower limit switch 60 is closed, thereby energizing the coil 68 of the relay CR3, which moves the switch 84 to the second position, closes the switch 80, and opens the switch 75. The movement of the switch 84 to the second position connects the dc speed control output to the motor 46 to rotate in a reversed direction to move the carriage upwardly past the heating coils 52 for a second pass. The closing of the switch 80 permits power to be provided to the coil 68 of the relay CR3 when the carriage moves upwardly and the lower limit switch 60 opens. The opening of the switch 75 cuts off power to the cycle start push button 58, thereby disabling it.

When the carriage reaches the top of its upward travel, the upper limit switch 57 opens, which cuts off power to the coils 64, 66, 68, and 70 of the relays CR1, CR2, CR3, and TDLY, thereby completing the cycle of operation of the toaster.

Figure 6:
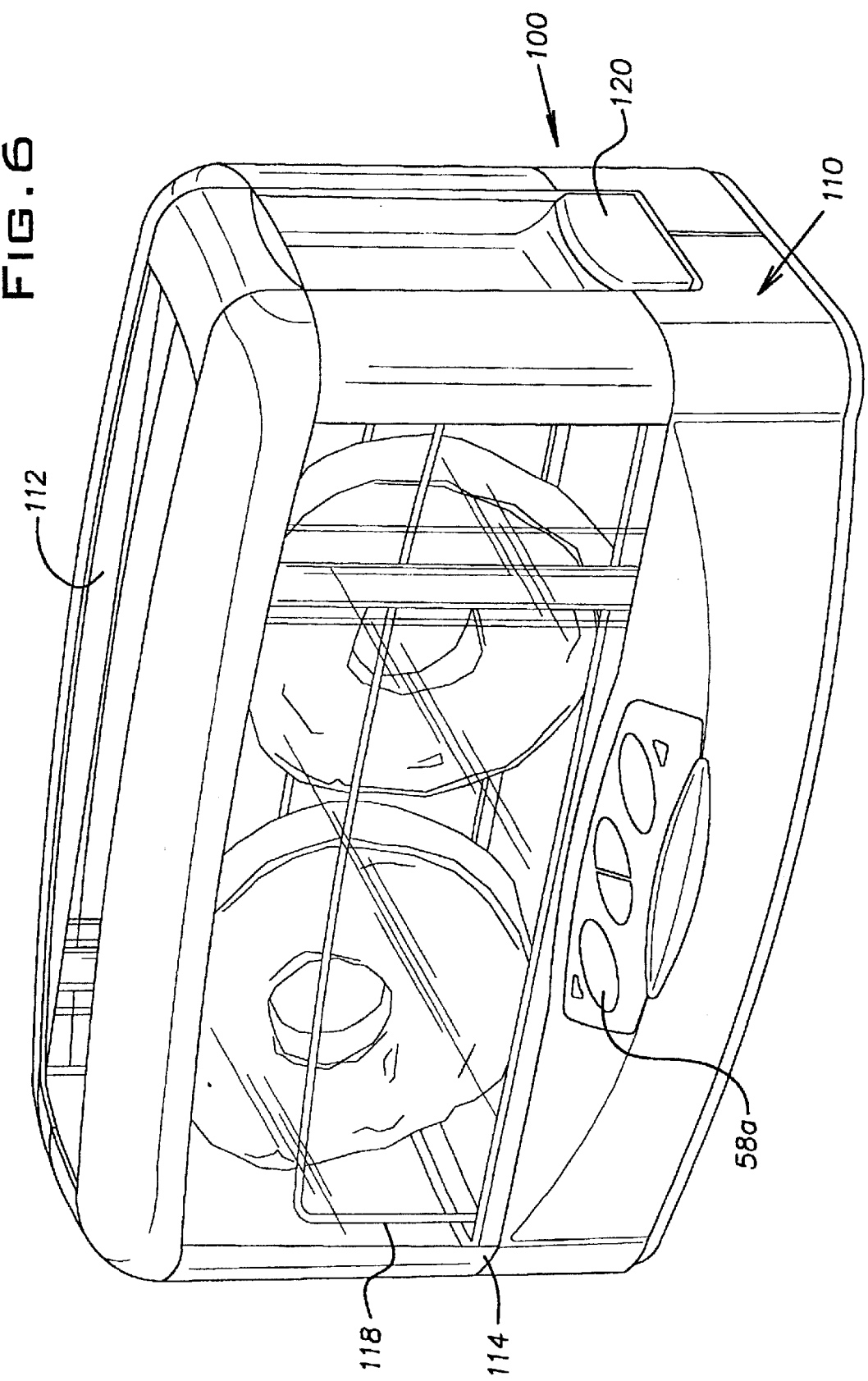
FIG. 6 is a perspective view of a toaster according to a further aspect of this invention.

Referring now to FIGS. 6, 7, and 8, there is illustrated a toaster 100 having a housing or casing 110 provided with a bread receiving opening or slot 112.

Referring more specifically to FIG. 7 the toaster 100 includes a bread receiving carriage 114 which is mounted for reciprocation on guide rods 116 and includes bread retaining wires 118. The carriage 114 is associated with conventional prior art mechanisms associated with conventional pop up toasters. Such mechanisms include a manually operated slide handle 120 (FIG. 6) which is connected to the carriage 114 and which lowers the carriage against the bias of a spring 122. A locking mechanism, which may be a solenoid operated latch 124, is provided to retain the carriage 114 in a lowered position during a toasting cycle but which is released at the end of the cycle so that the carriage is driven upwardly by the spring 122.

The mechanism illustrated in FIG. 7 performs substantially the same toasting operation as the mechanism illustrated FIGS. 1 and 2, but the mechanism shown FIG. 7 employs linear heating elements 126 and 128 which are movable relative to the article to be toasted as opposed to moving the article to be toasted past the stationary heating elements as is shown in FIGS. 1 and 2.

Furthermore, in the embodiment illustrated in FIG. 7 the operating circuitry is substantially identical to that illustrated in FIGS. 3 through 6 and will not be described again in detail.

An endless drive chain 130 is trained about idler sprockets 132, 134, and 136 and is driven by a drive sprocket 138. The drive sprocket 138 is, in turn, driven by a reversible dc motor 46a. The linear heat sources 126 and 128 are fixed to the chain for movement therewith and are guided at their lower ends by troughs 140.

With the carriage 114 in a down and locked position, a cycle start button 58a is depressed to initiate a preheat operation similar to the operation described with respect to the embodiment shown in FIGS. 1 and 2. At the completion of the preheat portion of the cycle, the motor 46a drives the chain so that the heating elements 126 and 128 are driven in opposite directions to traverse the bread surfaces in a first pass and at a rate which is sufficient to drive moisture from at least the surface of the bread, but which is insufficient to significantly darken the surface. At the completion of the traversal of the heating elements 126 and 128 in the first direction, as determined by the position of a normally open limit switch 60a which corresponds to the limit switch 60, the limit switch 60a is closed. When the limit switch 60a is engaged by the heating element 126 the motor 46a reverses its direction and the heating elements 126 and 128 progressively traverse the surface area of the articles to be toasted with a second pass and at a rate which is sufficient to darken and toast the surface to a desired degree. At the completion of this traversal, the linear heating element 126 engages a normally closed limit switch 57a, which corresponds to the limit switch 57, to terminate the toasting cycle as previously described. However, in addition, the solenoid latch 124 releases the carriage 114 so that it may be driven to an up position by the spring 122 to permit removal of the toast from the slot 112.

Referring now to FIG. 8 there is illustrated, in schematic fashion, an embodiment which is similar to FIG. 7 but which employs an alternate mechanism for traversing the heat sources past the bread surfaces. The conventional bread carriage pop up mechanism is identical to that illustrated and described with respect to FIG. 7 and is not repeated in FIG. 8 for purposes of simplicity.

In FIG. 8, a drive motor 46b has an output shaft 200 provided with a pair of spaced drive sprockets 210 and 212. A pair of chains 214 and 215 extend between the drive sprockets 210 and 212 and a pair of idler sprockets 218 and 220. At the completion of the preheat portion of the cycle, the motor 46b drives the chains 214 and 216 so that heating elements 222 and 224 attached to the chains are driven as a spaced parallel unit past opposite sides of the bread in a first pass. At the completion of the traversal of the heating elements in the first direction, as determined by the position of a normally open limit switch 60b which corresponds to the limit switch 60, the limit switch 60b is closed. When the limit switch 60b is engaged by the heating element 224 the motor 46b reverses its direction and the heating elements 222 and 224 progressively traverse the surface areas of the articles to be toasted with a second pass. At the completion of this traversal, the linear heating element 224 engages a normally closed limit switch 57b, which corresponds to the limit switch 57, to terminate the toasting operation.

Figure 9:
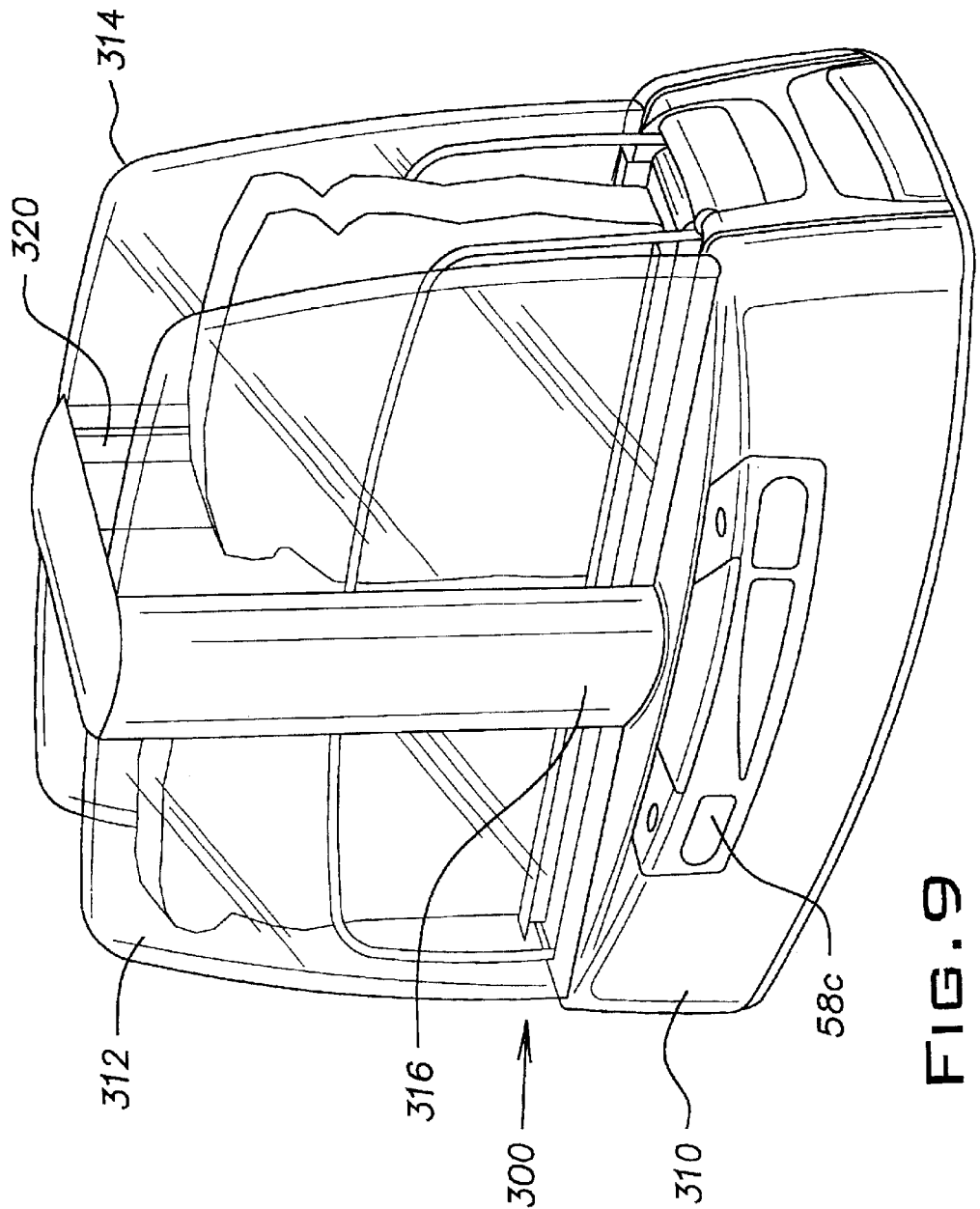
FIG. 9 is a perspective view of a toaster according to a further aspect of this invention.
Figure 10:
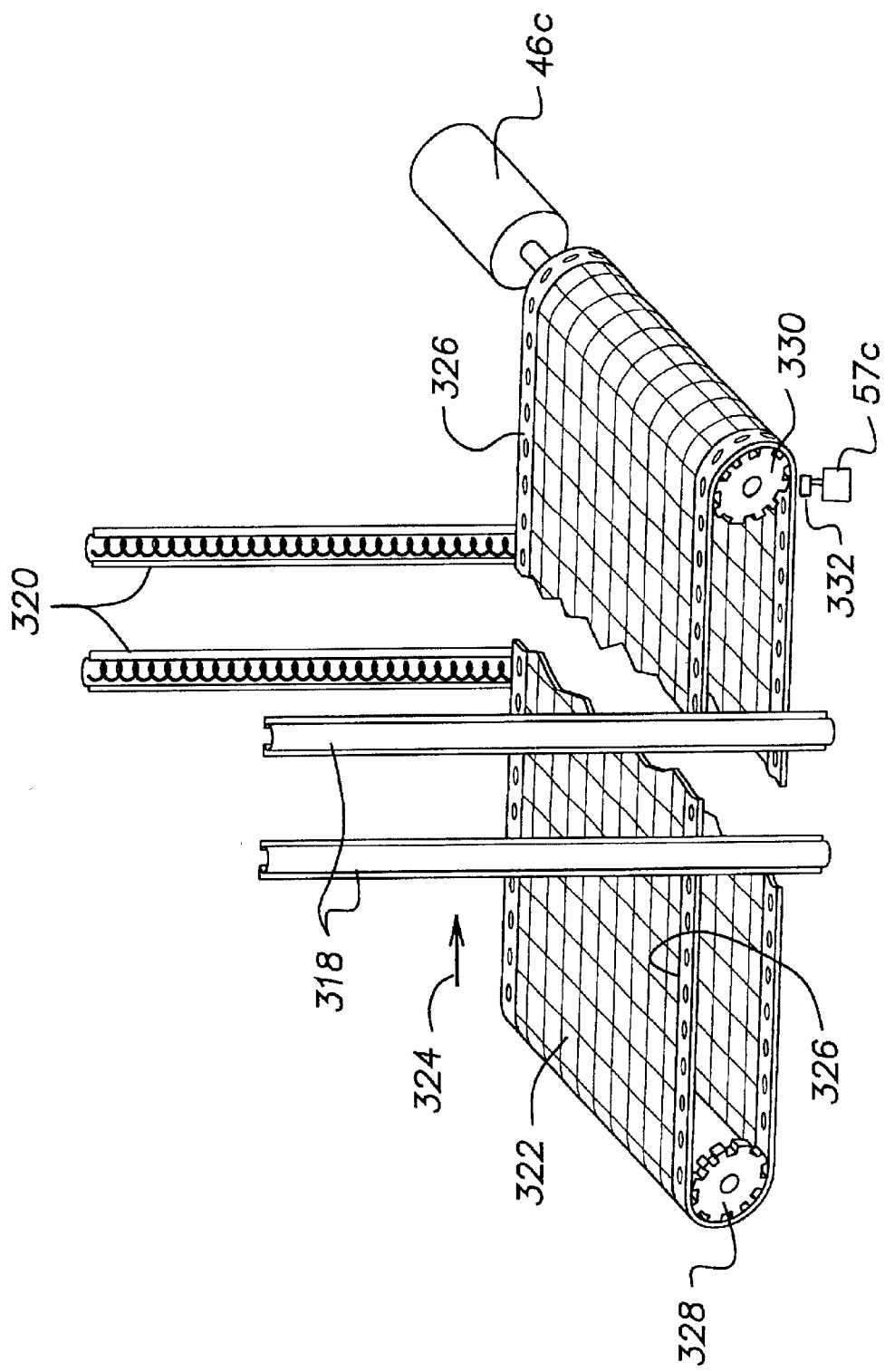
FIG. 10 is a schematic view of certain interior operating structure according to another aspect of this invention.

Referring now to FIGS. 9 and 10, there is illustrated a toaster 300 according to a still further aspect of this invention. The toaster 300 includes a base 310 and transparent side panels 312 and 314. The toaster 300 has open ends for the insertion and discharge of articles to be toasted. A heating element housing 316 is provided in the mid portion of the side panels 312 and 314 and enclose a pair of linear heating elements 318 and 320 on each side of the toaster 300.

As may be seen in FIG. 10, a bread conveying belt 322 receives bread at one end of the toaster 300 for conveyance in the direction of the arrow 324. The belt 322 may be a wire mesh having perforated drive tracks 326 at its lateral edges. The drive tracks 326 engage an idler sprocket roll 328 and the belt is driven by a drive sprocket roll 330. The drive sprocket roll is, in turn, driven by a dc drive motor 46c.

In a toasting cycle, the bread is driven by the conveyor belt 322 past the linear heating elements 318 and 320. A first one of the elements 318 and 320 serves to drive out the moisture and the second one of the elements serves to darken the bread in the manner previously discussed.

The control circuit for the toaster 300 is similar to the circuit illustrated in FIGS. 3, 4, and 5, but since the bread is conveyed in a single direction past paired heating elements, a reversing circuit for the motor 46c is not needed. A single limit switch 57c, corresponding to the limit switch 57 in FIG. 3 is provided to shut off the motor 46c at the end of the cycle. To this end, there is provided a cam button 332 on the track 326 which engages the switch 57c. The preheat circuit is provided, as is a start switch 58c. The bread is loaded onto the belt 322 at the completion of the preheat cycle which, of course, is indicated by movement of the belt 322.

What is claimed:

1. A bread toaster comprising a toaster housing, at least one slot opening in said housing adapted to receive an article to be toasted, a substantially linear heat source within said housing and adjacent opening, a holding carriage moveable relative to said slot opening between a first position adjacent said opening and a second position spaced from said opening, a drive transmission between said carriage and said motor adapted to move said carriage form said first position to said second position and from said second position back to said first position, a start switch adapted to energize said heat source and to energize said motor to drive said carriage from said first position to said second position and back to said first position, and a stop switch responsive to movement of said carriage to de-energize said motor and terminate carriage travel.

2. A bread toaster according to claim 1 wherein said start switch energizes said linear heat source for a predetermined period of time sufficient to preheat said source, and energizes a time delay device which, in turn energizes said motor at the completion of said predetermine.

3. A bread toaster according to claim 1 wherein a pair of spaced single linear heat sources are provided to heat opposite sides of said bread.

4. A bread toaster according to claim 1 wherein said heat source comprises a ceramic rod wound with a resistance heating element.

5. A bread toaster according to claim 1 wherein said housing has opposite transparent sidewalls which permit viewing of the surfaces being toasted.

* * * * *